July 21, 1970 C. L. McAFEE ET AL 3,520,994
COMBINATION RASTER AND CALLIGRAPHIC SCANNING TECHNIQUES FOR
AIRCRAFT DISPLAYS
Filed Jan. 12, 1967 6 Sheets-Sheet 1

INVENTORS.
CHARLES L. McAFEE
CHARLES K. SNYDER
PAUL C. CONGLETON

ATTYS.

INVENTORS.
CHARLES L. McAFEE
CHARLES K. SNYDER
PAUL C. CONGLETON
BY
ATTYS.

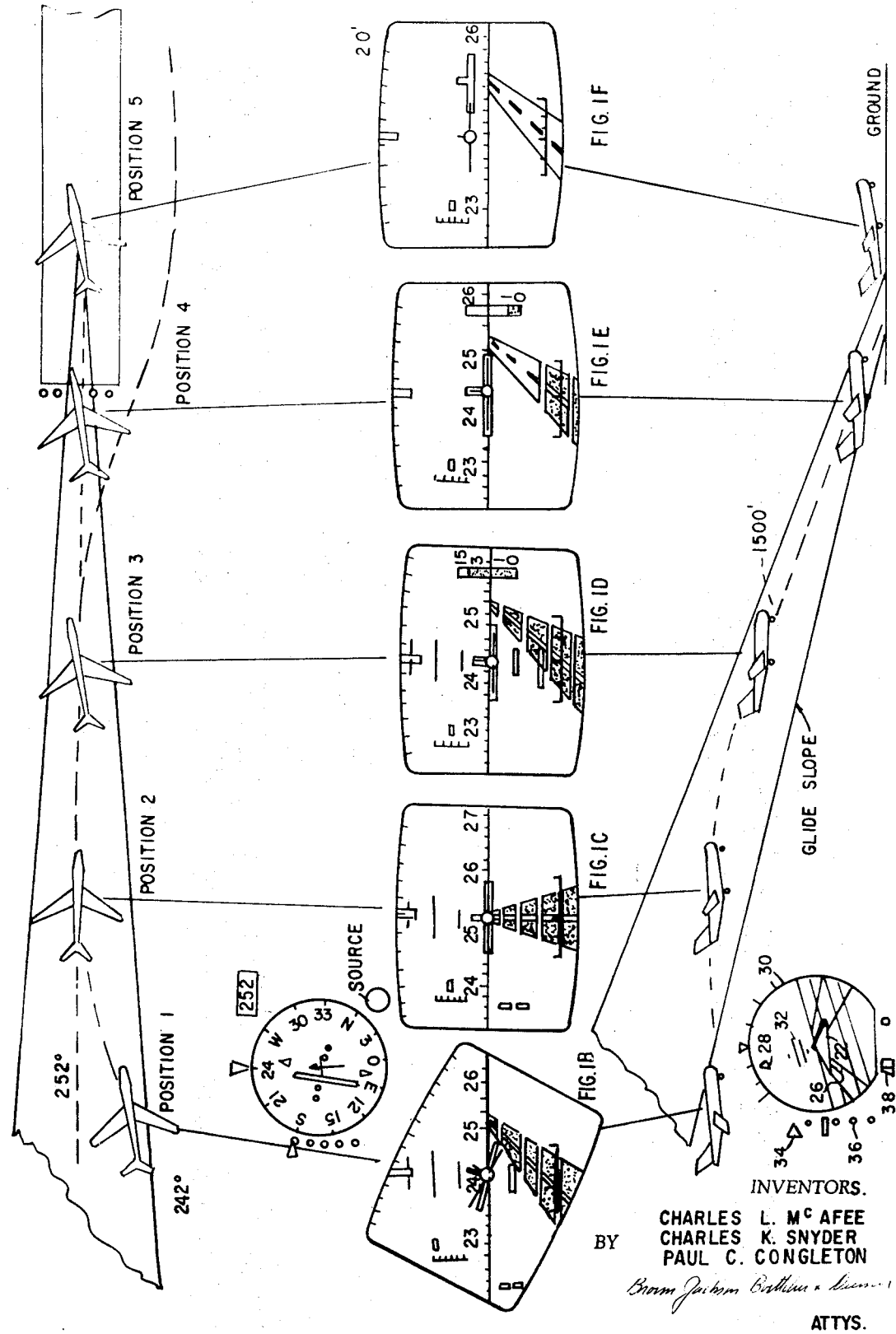

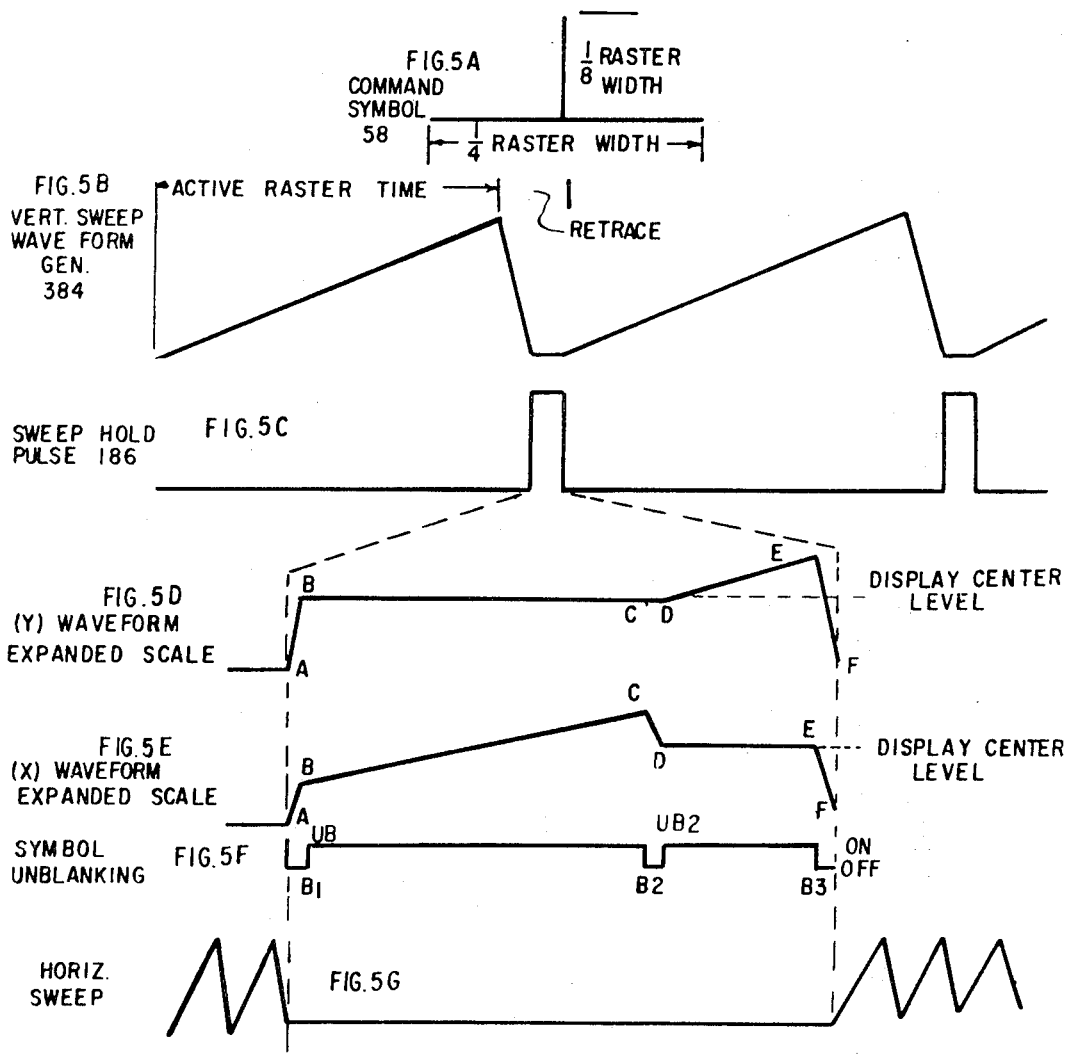

United States Patent Office 3,520,994
Patented July 21, 1970

3,520,994
COMBINATION RASTER AND CALLIGRAPHIC SCANNING TECHNIQUES FOR AIRCRAFT DISPLAYS
Charles L. McAfee, San Jose, Charles K. Snyder, Cupertino, and Paul C. Congleton, Menlo Park, Calif., assignors to Kaiser Aerospace and Electronics Corporation, Oakland, Calif., a corporation of Nevada
Filed Jan. 12, 1967, Ser. No. 608,848
Int. Cl. H04n 3/16
U.S. Cl. 178—6.8
20 Claims

ABSTRACT OF THE DISCLOSURE

Electronic generator circuits for providing aircraft attitude and command symbols on integrated display by raster and calligraphic techniques with independent movement for at least one symbol.

CROSS REFERENCE TO RELATED APPLICATION

The invention is specifically directed to circuitry for use in generating a display in a system of the type disclosed in the copending application for Display System for Providing Integrated Display of Aircraft Information, which was filed Oct. 10, 1966 by Paul C. Congleton, Hideki D. Izumi, Charles L. McAfee and Charles K. Snyder, Ser. No. 585,643.

BACKGROUND OF THE INVENTION

Field of the invention

The invention pertains to the field of symbol generation for display to aircraft pilots, and specifically to the display of symbols which provide the pilot with information indicating the actual aircraft attitude along with symbols which indicate the desired aircraft attitude.

Description of the prior art

The first practical system for use in "wings-level" flight without reference outside the aircraft to the real world comprised no more than an air speed indicator, a compass, an altimeter, an inclinometer and a rate of turn indicator. Though of relatively simple construction such instruments remain today in aircraft as a backup for the more sophistcated instruments now in use.

Progress over the years resulted in the addition, among other things, of a gyro horizon instrument from which the pilot could more graphically visualize aircraft attitude in terms of pitch and bank, and a directional gyro which provided more stability than the magnetic compass. Perhaps the most significant advance occurred with the development of navigational aids, such as automatic direction finders and omni ranges which resulted in the ability to provide a graphic representation to the pilot of aircraft position relative to a desired course. Manifestly, the provision of this increased amount of information to the pilot resulted in an increase in the number of aircraft instruments which were necessarily monitored by the pilot in flight. However, as the speeds of the aircraft increased during take-off, landing and flight, the time for instrument scan became increasingly shorter and a new problem arose.

In the early 1950's an attempt was made to combine aircraft heading, omni range deviation, aircraft attitude and flight command into a single unit known as a zero reader. The device proved to be inadequate and was short-lived. The art then progressed to the development of an attitude director indicator (essentially a gyro horizon with flight command in pitch and roll) and a horizontal situation indicator which is basically a compass with deviation indication for omni range and in some instances an automatic direction finder indicator. Such instruments are currently used in commercial aircraft.

More specifically, in order for the pilot to properly evaluate the performance of the automatic systems now in use, it is necessary to provide accurate information to the pilot relating to (a) the actual attitude of the aircraft about its several axes, (b) command information indicating the attitudes to be effected to achieve the optimum flight situation, and (c) information setting forth the "horizontal situation" of the aircraft. Attitude information, for example, may include the pitch, bank and heading of the aircraft. Horiozntal situation information, as the name implies, includes the display of relative displacement of the aircraft from the selected course and the relationship of the course to the aircraft. Command information identifies the attitudes to be executed to reach the optimum flight condition.

The provision of a system capable of presenting command information and attitude information in an integrated display requires the solution of complex display problems and requirements. That is, in achieving a display with provides attitude and command information to the pilot in the same video display, it is essential that the first cue set which provides the attitude information relating to the actual pitch and roll attitudes of the aircraft be maintained on the display at the same time changes in the presentation of the command pitch, roll and yaw information are provided on the same display. Further, as the aircraft controls are adjusted to maneuver the aircraft in the direction of the command attitudes, the resultant changing attitude of the aircraft must be refletced in the actual cues whereas the command cues for the most part will remain unchanged uring the initial portion of the maneuver. As the aircraft change in attitude continues, both sets of information cues on the display are likely to change both in their position and in their relative position. Manifestly, the separate control of discrete related sets of information on a common display requires new and different apparatus.

SUMMARY OF INVENTION

The present invention provides a novel system which includes a first video generator means for providing waveforms to produce a first set of cues on the display means, a second video generator means for providing waveforms which provide a second set of cues on the display means, and roll means for effecting roll of one of said cue sets on said display independent of roll of the other of said cue sets on said display.

It is an object of the invention to provide a system of such type wherein the roll means include input means for providing roll signals to said first and second video generator means, a first control means for effecting roll of the cues of said first and second sets in response to said roll signal, and a second control means for effecting roll of a second set of cues in a direction opposite to and by an amount related to the degree of roll introduced by said first control means, whereby the common control of the two sets with actual changes in the aircraft attitude will not result in the improper display of information by the command set.

In providing the novel display in which the indicated relationship of command and attitude information is achieved, it is further desirable that the command symbols be presented so as to be of increased brightness and of a finer line structure or texture than the shades of gray which are normally experienced in a pictorial representation on a raster presentation, and it is therefore a further object of the present invention to provide a novel display which includes means for presenting attitude information on a raster of the display means, and means for writing the command information on the same means which provide the raster, such presentation of the two sets of information being provided on a time-sharing basis.

It is a specific object of the invention to provide a display system which includes a cathode ray tube having deflection means, raster generator means for controlling the deflection means to provide a raster on the display means, a first video generator means for providing waveforms to the electron gun of the cathode ray tube to produce a first set of cues on the raster, a second video generator means for providing waveforms to control the deflection means to effect writing of the second set of cues on the display means, and means for providing a hold pulse to limit raster generation during said period of cue writing.

It is a further object of the present invention to provide a novel system which includes means for providing a first and second set of command information on the same display which provides a raster presentation of attitude information, the first and second set of command information being provided after alternate raster traces whereby an additional amount of information may be displayed with the increased brightness and finer line structure, even though a limited time is available for line writing purposes in the combined use of raster and line scan techniques. That is, in holding the raster for the purpose of effecting line writing, only a very brief trace is made available for calligraphic purposes, and the writing of one symbol, for example, may exhaust the available time. It has been found that by using the period after alternate raster traces to write different symbols, an increased amount of information may be provided by calligraphic techniques.

As noted hereinabove, the existing mechanical displays previously known in the art were not completely satisfactory by reason of the large number of instruments which were required to present the constantly increasing amount of information which must be monitored by the pilot in flight. Such problem was futher complicated by the increasing speed of aircraft during the various flight modes which in turn resulted in a decreased time in the scanned period which the pilot has available to read and integrate the information which is obtained from such instruments. It was found particularly difficult in the case of mechanical devices to incorporate along with other information, the yaw commands which were desirably presented to the pilot during the landing mode, and it is a specific object of the present invention, therefore, to provide a single integrated display which includes means for providing a command symbol which is banked to display roll commands, which is moved vertically to display pitch commands, and which is moved horizontally to display yaw commands.

It is a further object of the invention to provide a novel system which provides a display of information relating to the aircraft attitude including roll, pitch and yaw as integrated on a display with command information which indicates the attitudes required to achieve the desired flight conditions.

BRIEF DESCRIPTION OF DRAWINGS

FIGS. 1A–1F are illustrations of typical displays provided by the novel system of the present invention including the novel integrated display of command and attitude information, and particularly exemplary showings provided for particular conditions and modes of flight illustrated thereat;

FIGS. 5A–5G illustrate the waveforms provided by the circuitry of FIG. 3 in achieving the presentation of the novel command symbol.

DESCRIPTION OF PREFERRED EMBODIMENT

Display information provided by display device

Figure 1A:
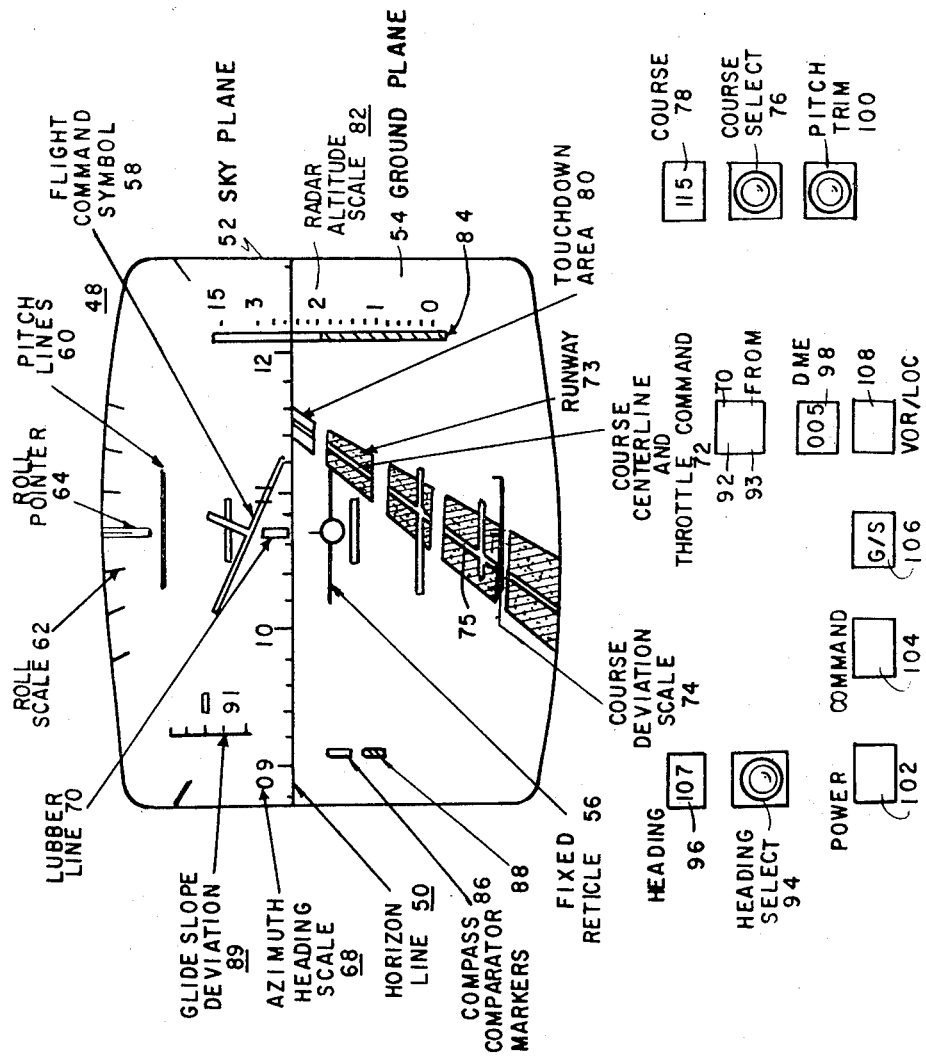

With reference now to FIG. 1A, the display presentation provided according to the novel concepts of the invention set forth in the above identified copending application are shown thereat. The information content of the display unit which is intended to replace both the course indicator and flight director now used in commercial airlines provides information including both electronically generated symbology which is displayed on the face of the cathode ray tube as well as discrete information in the form of numerical readouts to thereby provide a more flexible system capable of providing a substantially increased amount of information in a single display which is more nearly related to the real world.

The basic display 48 is shown in FIG. 1A. As there shown, the representation 48 includes a distinct horizon line 50, a sky plane 52, and a ground plane 54 which is shaded to simulate depth perspective. (The ground shading has not been shown in the drawings because of the difficulties involved in including such showing.) Superimposed upon the basic background 50, 52, 54, are information cues which may be basically categorized as attitude displacement and command information. More specifically, as shown in FIG. 1A, a fixed reference reticle or symbol 56 located in the approximate center of the display provides a fixed reference marking for the aircraft's horizontal and vertical axis. The aircraft reference 56 is comparable in size and shape with a flight command symbol 58 which will be described more fully hereinafter.

The display 48 further includes reference pitch lines 60 which will be generated through an elevation angle of plus-minus sixty degrees. Major pitch lines which also function as a horizontal reference will appear at plus-minus thirty degrees and plus-minus sixty degrees and will be coded to provide positive identification. Incremental pitch lines are provided at 5° and 10° in order to enhance pilot recognition of pitch up or pitch down attitudes, the lines below the horizon being white and the pitch lines above the horizon being black.

Movement or displacement of the aircraft about its roll axes is indicated on the display by means of a roll scale 62 in conjunction with a roll pointer 64, the roll pointer 64 enabling the pilot to ascertain in actual degrees the amount of displacement of the aircraft about the roll axes. The indication of rotation displacement of the aircraft about its roll axes is also provided by rotation of the horizon line 50 with reference to the fixed aircraft vertical 56, such displacement providing an indication and approximation of the degree of roll without the preciseness achieved by the roll scale and pointer.

It will be recognized from the foregoing description that the attitude representation provided by the sky, horizon, ground portions 52, 50, 54, the pitch information provided by pitch lines 60, the roll information provided by the roll scale 62 and pointer 64, all of which are viewed with reference to a fixed reticle 56, comprise the information presented by the known types of electromechanical flight directors. The command information normally presented by known flight directors by means of command bars appears in the present display as a flight command symbol 58 which comprises a bright white inverted T which is utilized to present roll, pitch and yaw commands. The command is indicated by the positioning of the flight command symbol in the required roll, pitch or yaw attitudes independent of the remainder of the display. The pilot upon viewing movement of the command must respond by flying the fixed aircraft symbol 56 in such manner as to superimpose the symbol 56 upon the flight command symbol 58.

The flight command symbol is capable of showing 360 degrees of roll command. The pitch and yaw commands are constrained such that the command symbol will always remain within the viewing window. The pitch command will be limited to plus and minus ten degrees from existing aircraft pitch angle, and the yaw command range will be limited to plus and minus ten degrees from existing aircraft heading. Pitch or yaw commands in excess of this range will cause the symbol to move to maximum position of displacement and remain there until the command response reduces the error.

Heading and displacement information, such as glide slope deviation, course deviation, and the like, which are presented by the course indicator in prior art systems are also included on the display.

The azimuth heading which is provided by the azimuth card on the known mechanical units, is presented in display 48 as a moving tape 68 which extends along the horizon line 50, the digital representation which appears at the vertical lubber mark 70 serving as a reference for instantaneous aircraft heading. Turning of the aircraft or "change in aircraft heading" results in displacement of the tape along the horizon to bring correspondingly different numerals into view. The numerals are presented at ten degrees intervals, the ten degree intervals in turn being subdivided by index marks at two degree intervals.

Horizontal situation information is also achieved by a course centerline 72 which provides a representation of the aircraft instantaneous displacement from a localizer course or a selected VOR radial and is presented in the display 48 as a dashed white line 72 which extends from the bottom of the display to the horizon 50.

The near end of the course centerline 72 represents course deviation from the VOR/LOC beam, the degree of which is indicated by a calibrated scale 74 at the lower edge of the display. The electronically generated scale 74 at the bottom of the display screen when utilizing ILS has a full scale range of plus-minus 2.5 degrees with incremental marks every 1.25 degrees. The position of the far end of the course centerline 72 is determined by the course dialed into the system by the Course Select Knob 76, the range of movement of the far end of the course centerline being limited to plus-minus 15 degrees from the aircraft heading.

The course centerline 72 also provides command throttle to the pilot, movement of the centerline dashed blocks 75 being effected toward the bottom of the display to indicate decreased throttle and toward the horizon line to indicate increased throttle. Thus, in responding the pilot moves the throttle in the same direction as the motion of the symbology. As the throttle is moved to the proper position, movement of the blocks 75 will terminate.

It will be seen from the foregoing description that the information previously provided by the horizontal situation indicator and flight director indicator in conventional aircraft is now included in an integrated display in a less confusing pattern which has a closer relation to the real world. In addition, display 48 further incorporates a three dimensional perspective presentation which is not achievable by indications on a dial indicator, and includes a centerline which is displaced at both the far and near ends to provide two different sets of information (i.e., as compared to the lateral deviation only of the vertical bar in the known mechanical units).

The display further incorporates a touchdown area which initially appears at the horizon as a wide, white ribbon 80 at such time as the touchdown area is first within range. As the aircraft continues its approach, the ribbon will move down the screen in a continuously lengthening manner. As the ribbon reaches the bottom of the screen, the pilot knows that the touchdown area has been reached. The course centerline 72 is changed from white to black in the ribbon area of the display to provide improved viewing conditions.

The novel display also includes numerous other information sets which are normally difficult to integrate into a single presentation. Thus, as shown in FIG. 1A, radar altitude is provided in the same display by means of a numeric ribbon scale 82 located at the right hand side of the display, the scale in the presentation shown in FIG. 1A extending from 0–1500 feet. The major portion of the scale will be a linear presentation of altitude from 0–300 feet with indices presented at intervals of twenty feet.

Two index markers 86, 88 located in the left hand portion of the ground texture display are used to compare the captain's compass with the flight officer's compass. The white index indicates the compass heading of the captain's instrument, and the black index represents the compass heading of the flight officer's instrument. If there is no error, the two markers will be vertically aligned. Any error will cause the flight officer index to move horizontally, and the amount and direction of an error can be determined by using the azimuth heading scale 68 as a reference.

A glide slope deviation scale 89 provides information analogous to that presented on the glide slope indicator of the known horizontal situation indicators, the display basically comprising an electronically generated scale 89 having an associated pointer 91 which is displaced along the scale for different degrees of deviation. The scale has a range of plus-minus ½ degree which is subdivided into ¼ degree increments. The glide slope deviation exceeding one-half degree will cause the pointer to remain at full scale deflection until the error has been reduced. In some embodiments at a given low altitude (i.e., 50 feet, for example), the glide slope deviation information may be removed from the display, or locked at the center position.

A course select knob 76, a heading selector knob 94, a heading digital readout 96, a course digital readout 78, a pair of "TO-FROM" lights 92, 93, and distance measuring indicator 98 are located on the front of the panel, and are operated and used in the conventional mode.

A pitch trim control knob 100 located on the front panel permits the pilot to trim the display between +10 degrees and −5 degrees of the actual pitch angle. Four warning indicators on the front of the panel include a power failure indicator 102 consisting of a mechanical flag which is moved to the off position if power fails for any reason, a command failure indicator 104 which results in the illumination of a red indicator if any input signal to the flight command symbol is disrupted, a glide slope failure indicator 106 which consists of a red indicator which will light if the output signal from the glide slope receiver is disrupted, and a VOR-LOC failure indicator 108 which consists of a red indicator which will light if the output signal from the VOR-LOC receiver is disrupted.

Typical displays presented during operation of aircraft in blind landing approach As will be apparent, there exists in the display all information necessary to inform the pilot as to the extent and mode of operation of the basic aircraft controls including the ailerons, elevators, rudder and throttle to operate the aircraft in accordance with the computed commands as necessary to the proper handling of the aircraft in all modes of the aircraft handling, including takeoff, climb, en route, approach/landing, go-around and roll-out taxi situations.

With reference to FIGS. 1B–1F, there is set forth thereat exemplary displays which will be presented to the pilot in a typical ILS approach. Pictorial representations of the horizontal situation of the aircraft is shown above each of the displays, and the attitude of the aircraft is shown below the displays as an aid to the understanding of the information which is provided by each display. By way of further explanation, illustrations of the display which would be presented by a course indicator and flight director are shown adjacent to FIG. 1B for the same conditions of flight and command as are represented by the display in FIG. 1B.

It is assumed that at position 1 the pilot is departing his final navigational fix, and that the runway heading 252 has been dialed into the equipment by adjustment of course selector knob 76 (FIG. 1A) and the flight director computer has selected course 242 to intercept such heading. (While commercial aircraft include such equipment, not infrequently such intercept course will be provided from the control tower at the airport.)

As a result of dialing in the course 252, the far end of the course centerline on the display will be adjusted to the azimuth heading 252 degrees on the compass tape, and the near end of the course centerline will position itself relative to the deviation indicator 74 by a value consistent with the deviation of the aircraft from the selected vector.

With reference to position 1, with the aircraft on heading 242 and approaching the selected vector 252 as shown, the pilot will expect to begin a bank toward the right so as to arrive on the desired course and heading to reach the selected runway.

As shown in the display of FIG. 1B, the near end of the course line indicates a deviation of approximately two degrees from the selected course, and the roll scale at the top indicates a bank of 25 degrees has been initiated. The aircraft at the time of the display in FIG. 1B is on heading 242. The far end of the course centerline is still at 252 and the aircraft is banked to the right and turning into the selected course 252. The displacement of the fixed symbol (black) in a greater bank than the command symbol (white) indicates that the aircraft is banked too far, and the pilot's reaction should be to decreased the right bank until such time as the black symbol coincides with the white symbol. The radar altimeter in FIG. 1B is not displayed since the plane has not descended to below 1500 feet. The glide slope is above the aircraft, as indicated by the white marker adjacent the upper portion of the glide slope deviation scale, and as illustrated by the aircraft position sketch below FIG. 1B.

As the aircraft approaches position 2, the display (FIG. 1C) will be shown (on course 252, zero bank and on glide slope). The command symbol and the reference aircraft symbol are coincident, and accordingly the pilot is informed that the aircraft is being flown in accordance with the command information.

As the aircraft advances to the position 3, the plane is shown by the display of FIG. 1D to be on glide slope, and the aircraft which is flying heading 242 has a crab correction to the left of ten degrees (the end of the course centerline is on the selected heading of 252 degrees and the heading of the aircraft is 242 degrees as shown by the azimuth tape).

The compass comparator information is removed as the pilot descends to below a certain altitude (1500' in the present embodiment) so that information to be observed on the display during the critical moments of landing is reduced. It is also apparent that the radar altimeter now appears on the display and the far end of the course centerline is white to indicate that the end of the runway or touchdown area is coming into view.

As the aircraft moves to position 4, the radar altitude as shown in FIG. 1E is ninety feet, and the aircraft is on glide slope, but not yet over the touchdown point. The incremental pitch lines have also been removed at this time to reduce clutter and simplify the presentation. The primary cue consisting of the horizon line will produce sufficient indication of the pitch at this time. As shown, the touchdown point has advanced farther down the display.

As the aircraft reaches position 5, the aircraft is over the touchdown point and in the landing attitude, and the flight command symbol has been moved laterally to the right calling for right rudder. Since the altitude is very low at this time, the glide slope information has also been removed. The pilot's response to such command is to apply right rudder to reestablish coincidence between the black reference vertical and the white command symbol. At this time, the aircraft should make contact with the ground.

General description of circuitry for providing integrated flight display

Figure 2:
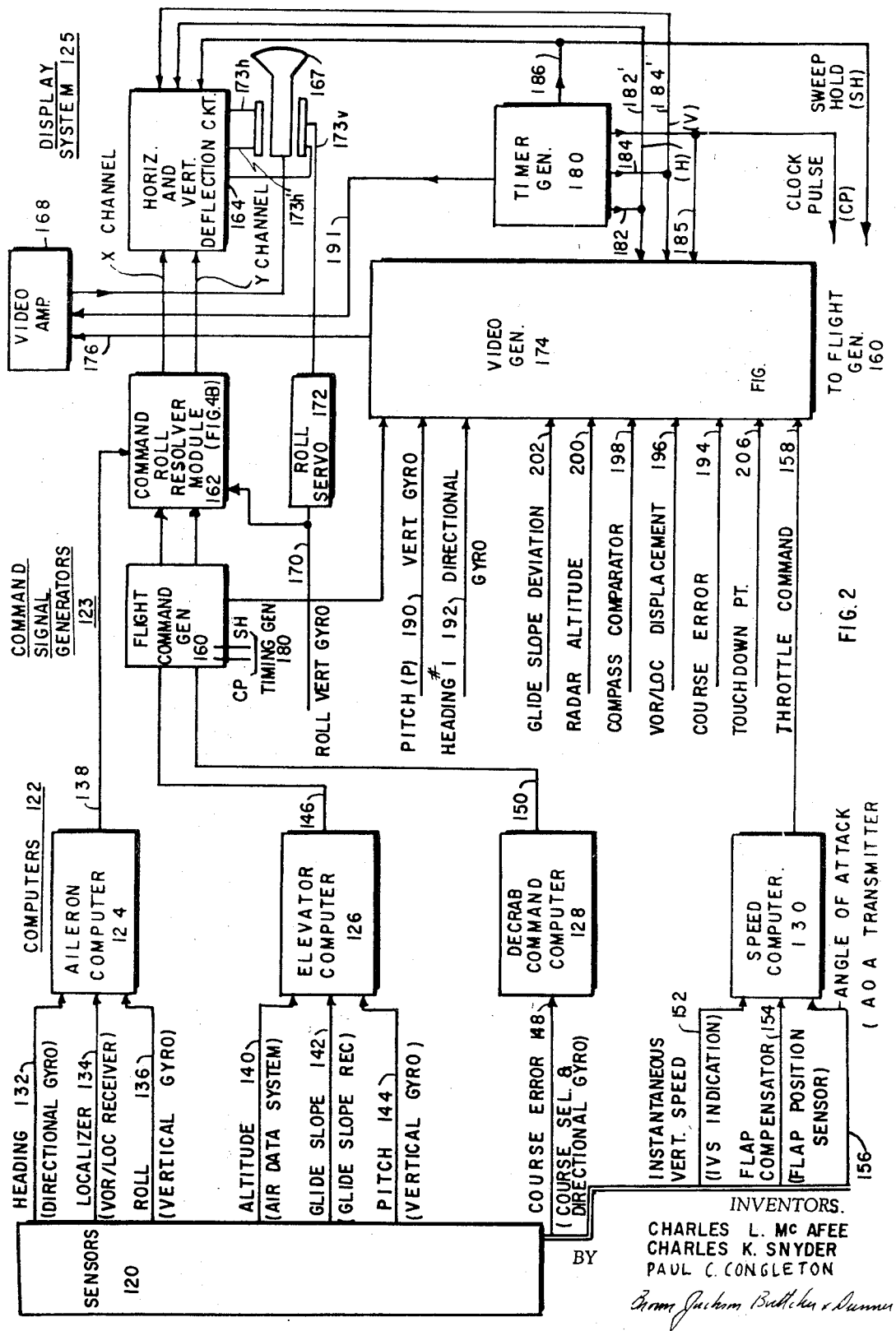
FIG. 2 comprises a block diagram of the system components.

With reference now to FIG. 2, there is shown thereat in block form the basic sensor and circuitry equipment which is utilized in the generation of the display 48. As there shown, the system basically comprises a plurality of sensor means 120 which sense the aircraft attitude and horizontal situation, and couple such information to a set of computers 122 which utilize such information to provide signals indicating the action to be taken to obtain the desired flight of the aircraft. Command signal generators 123 are responsive to the signals output from the computers 122 to generate signals which are fed to a display system 125 for presentation to the pilot as a visual display.

The sensor means 120 and the computer means 122 are well known and presently in use on commercial aircraft. Details of one commercial embodiment may be found, for example, in the technical manual entitled "All Weather Landing Display for DC7" which was published June, 1964 by Sperry Gyro Company, Report No. RD64–71, and which is obtainable from the Clearing House for Federal Scientific and Technical Information of the United States Department of Commerce. Specific reference is made to pages 24, 25 for the computer circuitry and the inputs which are provided to the computers for use in providing command signals to the pilot.

For the purpose of the present invention, computer equipment 122 is shown to include an aileron computer 124, elevator computer 126, decrab command computer 128, and speed computer 130. As shown in FIG. 2, the aileron computer 124 receives (a) signals indicating the aircraft heading from the directional gyro over input lead 132, (b) signals indicating the localizer heading from the VOR/LOC receiver over the localizer input 134, and (c) signals over roll input 136 from the vertical gyro which indicate the aircraft roll attitude. The aileron computer 124 constantly provides roll command signals over roll output conductor 138 to command roll module 162 for use in adjusting the flight command symbol 58 (FIG. 1A) as generated by flight command generator 160 to different relative positions of roll displacement.

The elevator computer 126 receives (a) altitude information over input conductor 140 from the air data system (altimeter, etc.) of the aircraft, (b) glide slope information over input conductor 142 from the glide slope receiver, and (c) pitch information over conductor 144 from the vertical gyro. The elevator computer 126 provides pitch command signals over output conductor 146 which as will be shown determine the vertical displacement of the flight command symbol 58 from the display center.

Decrab command computer 128 receives course error information over conductor 148 from the aircraft course selector and directional gyro equipment and operates in a conventional mode to provide yaw command output signals over conductor 150 which as will be shown are used to effect lateral displacement of the flight command symbol 58 from the display center to provide yaw (rudder) commands to the pilot. Brief reference is made hereat to the fact that in equipment now used in the field, the decrab information is displayed to the pilot as movement of an indicator which comprises a small scale and associated pointer, and it is necessary during critical periods of landing to integrate both the different information bits provided by the two instruments (FIG. 2) as well as the decrab information provided by this small, poorly positioned indicator. It is apparent that in the present system such information is integrated directly into the novel command symbol, and an improved, more reliable system is achieved.

Speed computer 130 receives instantaneous vertical speed signals over conductor 152 from the aircraft IVS indicator; flap compensator signals over conductor 154 from the aircraft flap position sensor; and angle of attack signals over conductor 156 from the aircraft angle of attack transmitter. Speed computer 130 is operated in a known manner to provide output signals over conductor 158 indicating command speed which signals, as will be shown, are used to effect movement of the dashed centerline 72 of the course centerline symbol toward the horizon or toward the bottom of the display in the throttle command.

Command speed in the newer aircraft equipment is achieved by direct control of servos which operate the throttle when the unit is connected in the automatic throttle mode. However, in some aircraft, the command throttle information is coupled to a unit having a graduated scale which is located on the left hand side of the attitude director indicator, and an associated pointer is displaced along a vertical axis to indicate the request for more or less throttle. The continued observation and the novel manner of an animated presentation of throttle speed in the present display considerably reduces the possibility of pilot error.

As noted above, the outputs of the aileron computer 124, elevator computer 126, decrab command computer 128 and speed computer 130 as presently used in commercial aircraft are connected as inputs to the novel signal generators 123 of the present invention to effect the generation of the displays of FIGS. 1A–1F. The flight command generator 160 is controlled by the pitch command signals and yaw command signals output over conductors 146, 150 from the elevator computer 126 and the decrab command computer 128, respectively, and is operative to effect generation of the inverted T flight command symbol 58 at a position on the display which is a function of the value of the pitch and yaw command signals. The output of the flight command generator 160 is in turn connected to command roll resolver module 162, which adjusts the symbol about its roll axis by an amount related to the aircraft bank required as indicated by the signals output over conductor 138 from aileron computer 124.

The command roll resolver module 162, as will be shown, basically comprises a sine-cosine pot which modifies the signals input from the flight command generator 160 in accordance with the roll command signals received from the aileron computer 124 and the actual roll signals input over path 170, whereby the symbol is displaced about its roll axis by an amount related to the difference between the command roll and the actual roll.

The signals output from command roll resolver module 162 are fed over an X channel and a Y channel to the horizontal and vertical deflection circuits 164 which are operable to control the position of the electron beam of the cathode ray tube 167 during the period the beam is used to trace the command symbol.

The horizontal and vertical deflection circuits 164 for the cathode ray tube 167 are controlled at other times by timing generator 180 which provides horizontal sync pulses over conductors 182, 182' and vertical sync pulses over conductor 184, 184' to the horizontal and vertical deflection circuits 164 to control same in the cyclic provision of a raster at a sixty cycle rate. Additionally, as will be shown, sweep holder pulses provided by the timing generator 180 over conductor 186 occur during the retrace period to terminate the raster sweep for a brief period of time (in the order of 20 lines), and during such period the input signals from the flight command generator 160, 162 to the horizontal and vertical deflection circuits 164 control the beam in the writing of the command symbol on the display at the X, Y position and roll attitude indicated by the signals received from the computers 122. A signal from timing generator 180 over conductor 191 controls the video amplifier 168 to unblank the gun of the cathode ray tube 167 during the period of the command symbol trace.

The command signal generators 123, in addition to the flight command generator 160 for providing the command symbol on the display unit 167, also includes a separate video generator 174 which generates video signals for coupling over conductor 176 to video amplifier 168 and the electron gun of the display tube 167. The video signals which are electronically generated by video generator 174 in a manner to be described have waveshapes such that as applied to the gun during a raster trace, will effect the generation of the dynamic display shown in FIGS. 1A–1F including the sky portion, horizon line and a ground portion of varying intensity. (The flight command symbol 58 was generated by circuits 160, 162.)

The signals output from the video generator 174 are synced to the raster trace provided on the cathode ray tube 167 by timer generator 180 which provides horizontal sync pulses and vertical sync pulses over conductor 182, 184 to the video generator 174. Clock pulses are provided by timing generator 180 over conductor 185 at the rate of aproximately 4 million p.p.s. for a purpose to be described.

Video generator 174 may be of the type set forth in detail in the above identified copending application. However, for the purpose of understanding the present invention a brief description is set forth hereat of the input signals which are applied to the video generator 174 along with a brief outline of the portions of the display shown in FIG. 1A which are provided thereby. Video generator 174 is comprised of a plurality of separate waveform generators including a basic cue generator which provides signals having a waveshape which traces the sky portion 52, the horizon line 50 and ground portion 54 of the display. The basic cue generator for providing the horizon line, sky and ground may be of the type set forth in Reissue Patent 25,756 which issued Apr. 6, 1965, and which is assigned to the assignee of this invention. The position of these basic cues on the screen varies with changes in the pitch of the aircraft. Signals indicating the pitch changes are provided from the vertical gyro over pitch lead 190 to the video generator 174. With a pitch down condition, for example, the changing signal input will result in movement of horizon line 50 toward the top of the display and the display of a decreased sky portion and an increased ground texture portion. The waveforms which generate the pitch lines 60 are similarly adjusted to effect a corresponding change in the display of the aircraft pitch attitude.

With banking of the aircraft, roll signals received over roll input 170 from the vertical gyro control a roll servo 172 in the adjustment of a servo mechanism, which rotates the yoke assembly on the cathode ray tube 167 by an amount propotrional to the degree of aircraft bank. The display 48 (independent of the command symbol 58) is banked by a corresponding amount and the roll pointer 64 is displaced along the roll scale 62 to provide a numerical readout of the degree of bank of the aircraft.

With changes in heading of the aircraft, appropriate indications are provided from the directional gyro over input conductor 192 to the video generator 174 which in turn effects a corresponding adjustment of the azimuth heading scale 68, (assuming for example in FIG. 1A that the aircraft is turning to the right, the scale will move toward the left).

Signals provided over the course error input conductor 194 to the video generator 174 control the generator to adjust the far end of the course line 75 and assuming the turn is of a corrective nature, the far end of the course line will move to the left with the heading scale in its lateral adjustment across the screen.

The VOR/LOC displacement signal received over input circuit 196 from the VOR/LOC receiver equipment on the aircraft and video generator 174 effects a variation in the output signal which displaces the near end of the course line from the center of the deviation scale 74 a distance which is related to the signal value. As will be shown, the course deviation scale 74 is rotated with rotation of the yoke assembly on the tube 167 in response to banking of the aircraft and the near end of the path is always adjusted relative to such scale.

Input signals from the compass comparator are fed over conductor 198 to the video generator 174 to indicate differences in the reading on the two aircraft compasses and generator 174 effects a corresponding change in time of generation of the signals to effect relative displacement of the white and dark markings 86, 88 (FIG. 1A) to indicate the degree of correspondence of the compass of the flight officer and the captain. In addition, the video generator 174 receives signals over conductor 200 from the radar altimeter indicating the altitude of the aircraft, and the video generator 174 is operative to provide signals which result in a related adjustment of the indicating tape on the radar altitude scale 82.

The video generator 174 is also connected over conductor 202 to the glide slope receiver, and is operative to adjust the pointer 91 on the glide slope deviation scale 89 to a position which indicates the amount of deviation of the aircraft from the glide slope.

The video generator 174 is further connected over conductor 158 to throttle command equipment, and is operative responsive to receipt of command signals to adjust the symbols which make up the course centerline 72 to move toward the horizon or toward the base of the display with decrease and increase of the speed of the aircraft relative to a command speed.

Signals indicating the position of the aircraft relative to a selected touchdown point are fed over conductor 206 to the video generator 174 which is operative responsive thereto to provide a white video output which results in the presentation of the touchdown area 80 (FIG. 1A) in a corresponding, related position on the display.

Output of video generator 174

The output of the video generator 174 is fed over conductor 176 to video amplifier 168 and thereafter to the electron beam gun of the cathode-ray tube 167. As was previously noted, the cues or symbols provided by the signal output from video generator 168 are rotated on the display as a set with displacement of the aircraft about the roll axes, such manner of rotation being effected by mounting the deflection yoke 173 (FIG. 2) of the cathode ray tube 167 for rotation about the neck thereof by a roll servo 172. Orientation of these same display symbols on the display for different conditions of pitch and heading is, of course, provided by reason of the variable signals input to the video generator 174 as described above.

Command symbol

In addition to the symbology and displays described above, the novel invention also provides a display of command information in the form of an independently movable symbol 58 (an inverted T in the present example) to the pilot for use in maneuvering of the aircraft. Additionally the command information is presented to the pilot in superposed relation to the horizontal situation display so that the pilot may intelligently monitor the command in terms of his position relative to a selected course.

With reference to FIG. 1A, in use of the system the plane is maneuvered so that the fixed reticle 56 on the display is adjusted into overlay relation with the flight command symbol 58. With a display such as shown in FIG. 1A, for example, the pilot would increase the pitch of the aircraft and bank the craft to the right to bring the fixed reticle symbol 56 into superposed registration with the flight command symbol 58. It will be apparent therefrom that the circuitry must have the ability to adjust the command symbol to various coordinate positions and various angles of rotation independent of the basic background display. Similarly the circuitry must have the ability to adjust the basic background symbology to different positions of bank, pitch and heading independent of motion imparted to the command symbol on the display.

In many instances, it is highly desirable in the showing of command information to provide a symbol such as 58 which is brighter and has a finer line structure than can be generated with the raster scan. To achieve such presentation in the present application, stroke writing (also known as a calligraphic presentation) is utilized in the provision of the aircraft symbol. However, while having such advantage in the presentation of a symbol the calligraphic presentations generally are inadequate to portray shades of gray or pictorial information. It has been discovered that the combination of these types of presentations can have the advantage of both techniques; that is, a combined display which has a background raster for gray shade and pictorial information, and has stroke-writing for fine line symbols incorporates the advantages of both systems. Additionally, by providing the separate generating modes for the two different sets of information, each of the different information sets can be "rolled" independent of the other. That is, the raster and the symbology presented on the raster applying waveforms to the video generator can be rolled by rolling the deflection yoke, while the waveform which provides the stroke written symbols may be resolved and counter-rolled so that they remain stationary. Alternatively, the stroke written symbols may be rolled by resolving the command symbol waveform without rolling the raster. Finally both the stroke written and the raster drawn symbology may be rolled together. This manner of display generation permits considerably more versatility in the presentation which is not independently available when only one of these two forms of generation is used. The novel circuitry shown in block in FIG. 2, and in more detail in FIG. 3 effectively combines raster scanning and line writing symbology in the same display.

Fundamentally, such presentation is accomplished by stopping the deflection of the electron gun beam in the raster mode during vertical blanking, and using the beam to line write with X and Y deflection during this period. In other words, the normal raster horizontal drive is inhibited to stop the raster horizontal sweep. Since the coil associated with this sweep drive is of low inductance for high efficiency and sweep, it cannot be driven calligraphically without consuming an impractically large amount of power. Therefore, a separate horizontal coil with a much higher inductance is built into the deflection yoke. This coil is used during the calligraphic writing period for the horizontal or X deflection and the current in such use is held at zero during the raster time. The vertical coil impedance, working with the slower vertical raster scan, can be high enough to be compatible with the calligraphic system so that only one vertical coil is provided.

Raster generation and display

The electron beam of the cathode ray tube 167 (FIG. 3) is swept in the horizontal direction at the rate of 15,750 c.p.s. by horizontal sawtooth waveforms and is moved vertically by a vertical sawtooth at a field rate of 60 c.p.s., whereby an interlaced raster consisting of 262½ horizontal lines for a vertical field is provided (one field every 16.6 milliseconds). The waveform required to deflect the electron beam in the horizontal and vertical direction consists of either a voltage or current sawtooth waveform depending upon whether the cathode ray tube 167 is electrostatic or magnetic deflection. If an electromagnetic system is used, the sawtooth waveform can be aproximated by $I=At+C$ where I equals the current flowing through the deflection coil, A equals the ratio of the amplitude of the sawtooth to the active scan time, C is a constant which is a function of the raster centering. If electrostatic deflection is used the sawtooth can be approximated by $V=At+C$ where V equals voltage impressed across the deflection plates, $t$ equals active scan time (exclusive of retrace time) and C is a constant which is a function of raster centering.

Figure 3:
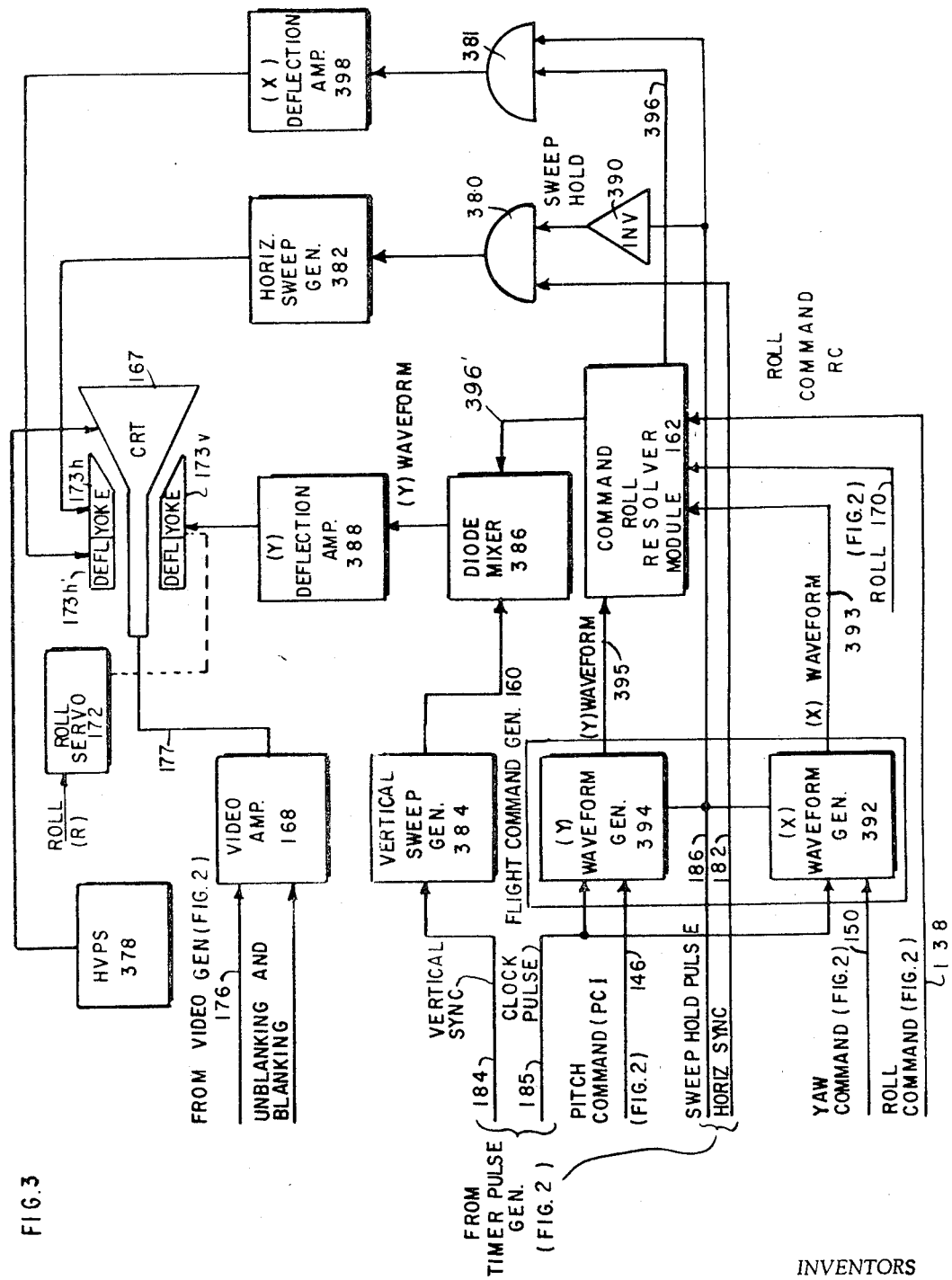
FIG. 3 sets forth the circuitry for generating the flight command symbol and the means for effecting horizontal, vertical and angular displacement thereof in a plurality of directions independent of the information provided by the video generator.

As shown in FIG. 3, two deflection coils 173h and 173h' are used to deflect the beam. Horizontal sync pulses are provided at the rate of 15,750 c.p.s. over conductor 182 by the timing generator 180 (FIG. 2) to AND gate 380 which normally has a sweep hold signal connected to a second input, so that the sync pulses are passed to drive a horizontal sweep generator 382 which in turn provides a sawtooth deflection waveform to deflection yoke 173h to effect the trace of the horizontal line across the raster in response to the occurrence of each horizontal sync pulse. Vertical sync pulses provided over conductor 184 drive the vertical sweep generator 384 in the provision of a vertical sawtooth deflection waveform, at the rate of sixty cycles per second, to the diode mixer 386 and thereby over deflection amplifier 388 to the vertical deflection yoke 173v. The cathode-ray beam as thus deflected provides a raster trace on the face of the cathode-ray tube 167 which is modulated by the input signals coupled over conductor 177 from video amplifier 168 for the video generator (FIG. 2). During each raster trace, the signals output from video generator 174 and video amplifier 168, as described herebefore, provide the display of the symbology of FIG. 1A thereon with the exception of the flight command symbol 58.

The sawtooth deflection waveforms (horizontal and vertical) used in the system to provide the raster are characterized by an active sweep time followed by an inactive sweep time or retrace time. The active sweep time in the case of the horizontal sawtooth wave is that time required to deflect the beam while painting a raster line, and the inactive time is that time required to retrace the beam to its starting point. During the inactive time the electron beam of the cathode ray tube is normally turned off by the blanking signals output from timer generator 180. The conventional horizontal raster scan sawtooth waveform will usually contain fifty-two microseconds of active time and about twelve microseconds of retrace or inactive time. The vertical sawtooth contains approximately 15.87 milliseconds of active time and .8 millisecond of inactive time. Further the horizontal sawtooth retraces approximately 262 times for each trace of the vertical deflection sawtooth. The foregoing exemplary values are typical of sweep times experienced in a conventional television set.

In order to implement the combination of raster and calligraphic scan techniques, it is necessary to inhibit the horizontal and vertical sawtooth waveforms which are normally applied to the vertical deflection coil 173v and the horizontal deflection coil 173h immediately after each raster trace, and before the start of the next vertical trace, so that the appropriate calligraphic waveform may be inserted in both the vertical and horizontal deflection channels to effect the trace of the command symbol 58 on the face of the cathode ray tube. Additionally, the timing generator 180 must be controlled to unblank the electron beam during the time the beam is being moved in the trace of the symbol generated by the calligraphic deflection waveform.

With reference to FIG. 5B, the vertical sawtooth provided by the vertical sweep waveform generator 384 determines the raster trace time and a retrace period thereafter during which the beam is moved back to the starting point for the next trace. As shown in FIG. 5C a sweep hold pulse is provided over conductor 186 during the retrace period (i.e., after each vertical field). The manner in which the flight command generator 160 (FIG. 2) is operative to generate waveforms which effect the trace of the symbol shown in FIG. 5A during such period will now be described.

Flight command generator 160

The flight command symbol generator 160 (FIG. 2) basically comprises an X waveform generator 392 which is operative as enabled to provide the waveform output shown in FIG. 5E, and a Y waveform generator 394 which is operative as enabled to provide the waveform output shown in FIG. 5D. The duration of the two output pulses of FIGS. 5D, 5E is related to the duration of the sweep hold pulse 186 (FIG. 5C) as referenced by the dotted lines to the waveform of FIG. 5C (the showing of FIGS. 5D–5F being in an expanded scale).

The waveform generators 392, 394 (FIG. 3) are triggered in response to the receipt of the leading edge of the sweep hold pulse over a first input circuit 186 to provide the illustrated waveform outputs, the waveform generation being controlled by clock pulses fed over a second input conductor 186 (CP) by the timing generator 180 to associated counters (not shown) which control gates to provide the waveform modifications at preset counts. A third input conductor 150 to X waveform generator 392 provides DC signals of variable values which are indicative of the yaw command to be displayed by effecting a corresponding lateral positioning of the symbol on the display. A third input conductor 146 to Y waveform generator 394 provides DC input signals of variable values to indicate different pitch commands for the aircraft, and to thereby effect corresponding variation in the vertical positioning of the flight control symbol 58. The pitch command DC input 146, for example, is added to the DC level of the Y waveform of FIG. 5D. This DC addition is constant for the period of the sweep hold pulse and thereby effects a corresponding vertical displacement of the entire flight command symbol. The yaw command signal over conductor 150 is added to the DC level of the X waveform in a similar manner to effect a corresponding change in the X coordinate of the flight command symbol.

The resultant output signals generated by the X, Y generators 392 and 394 are coupled over output conductors 393 and 395 to command roll resolver module 162 for mixing with the roll command signal provided over conductor 138, and as will be shown to effect a corresponding degree of roll in the command symbol display.

With reference to FIG. 5E which shows the X waveform provided by the X waveform generator 392, the amplitude of the segment AB of the wavefrom which occurs during blanking period B1 (FIG. 5F) effects adjustment of the beam to the horizontal coordinate for the position at which the initial left-hand lower line of the symbol is to be traced. Changes in the value of the yaw signal input on conductor 150 obviously adjust the amplitude of the segment as well as the other segments of the waveform and thereby alter the initial X coordinate of the symbol. As the gun is unblanked by the symbol unblanking pulse (UBI—FIG. 5F), the increasing waveform BC (FIG. 5E) applied to the horizontal deflection coil 173h' effects lateral movement of the beam across the screen for the interval BC to draw the lower line of the inverted T (FIG. 5A) on the display. The dotted line in FIG. 5E indicates the level for moving the beam to the horizontal display center of the raster, and it will be apparent therefrom that the bottom line of the symbol 58 (FIG. 5A) will extend to either side of the vertical center of the display (i.e., segment BC is bisected by the dotted line).

During the period CD (FIG. 5E) a second blanking signal B2 (FIG. 5F) is fed to the electron gun of the tube 167, and the beam is readjusted to the display center by a corresponding decrease in the value of the X waveform, which is maintained at such level during the remaining period (DE) of sweep hold pulse. During this later interval DE, the vertical line of the symbol is traced by reason of the Y waveform as will be described. Subsequent to the tracing of the vertical portion of the symbol (interval DE) a further blanking signal B3 (FIG. 5F) is provided, and the X waveform is decreased (EF) to return the beam to the left hand margin of the display.

With reference to the time related Y waveform shown in FIG. 5D the leading edge of hold pulse 186 initiates symbol generation by waveform generator 394 and during the first symbol blanking pulse B1 (FIG. 5F) the waveform AB (FIG. 5D) increases to a value determined by the input pitch signal, which value as shown in FIG. 5D will move the beam vertically half way between the bottom and top edges of the display. During the interval BC the X waveform is causing the beam to move to the right from the initial X coordinate, and the Y waveform remains at a fixed level (i.e., so that the beam moves horizontally to trace the lower line of the inverted T symbol). After the period B2 of symbol blanking and movement of the beam back to the lateral center of the display symbol (interval CD of the X waveform), the sawtooth DE (FIG. 5D) is applied to the vertical deflection coil to move the beam vertically during the unblanking period UB2 and thereby effect the trace of the vertical portion of the flight command symbol 58 on the display. With the vertical portion of the symbol traced, the further symbol blanking signal B3 occurs and the Y waveform is decreased in value (period EF) to return the beam to the lower marginal edge of the display. The X and Y waveforms have now returned the beam to the lower left hand marginal edge of the display for use in the next raster trace. (It was assumed in the foregoing description that the raster trace is from the bottom marginal edge towards the top marginal edge of the screen.)

As noted heretofore the flight command symbol presented on the display is displaced (a) vertically to different positions for the purpose of providing pitch-up and pitch-down commands, (b) laterally to different positions for the purpose of indicating heading and yaw commands, (c) and is rolled to provide bank commands.

Further, as was shown, pitch-up and pitch-down commands provided over conductor 146 to Y generator 394 effect a corresponding change in the DC level (slope AB of the Y waveform remains the same) so that the trace of the symbol will be initiated at a correspondingly different Y coordinate, (i.e., increased DC level to raise the symbol position on the display and a decreased DC level to lower the symbol position on the display).

In a similar manner heading or yaw commands are provided over path 150 to X waveform generator 392 to effect a corresponding change in the DC level AB of the X waveform (FIG. 5E) so that the trace of the symbol will be initiated at a correspondingly different X coordinate (increased DC level moves the symbol to the right of center and decreased DC level moves the symbol to the left center).

Roll commands for the symbol are fed over roll command path 138 (FIG. 3) to the command roll resolver module 162 which may comprise a sine-cosine control arrangement. With reference to FIG. 4B command roll resolve module 162 is there shown in more detail as comprising a synchro differential 525 (which may be of the type shown in "Basic Feedback Control Systems Design," Savant, published by McGraw-Hill 1958, p. 253), having one input connected to roll command conductor 138 and the second input connected to roll conductor 170. The shaft 526 of synchro differential is adjusted to a position related to the difference of the input signals on conductors 138, 170.

A sine-cosine potentiometer 527 has a first and a second arm 528, 529 displaced 90° which are driven by shaft 526 across the potentiometer resistance member 531. The Y waveform (FIG. 5D) on conductor 395 (FIG. 6) is fed to one tap 545 and over conductor 541, phase inverter 542, conductor 543 to a second tap 546 displaced 180° from tap 545 ($Y_1-Y$ inputs to pot. 527). The X waveform on conductor 393 is fed over conductor 530 to tap 547 (displaced 90° from taps 546 and 545) and over conductor 549, inverter 550, conductor 551 to tap 552 displaced 180° from tap 547 ($X_1-X$ inputs to pot. 527).

The X, Y output conductors 396, 396' are connected to the wipers 528, 529 respectively. It is thus apparent that the Y waveform is modified so as to introduce roll of the symbol about its center (the point of intersection of the horizontal and vertical symbol lines) by an amount related to the input signal on conductor 395. The modified Y signals are coupled over diode mixer 386 (FIG. 3) and deflection amplifier 388 to the deflection yoke 173v. The waveform output on conductor 393 from the X waveform generator 392 is likewise modified to reflect the roll command input to resolver module 162 and is fed over conductor 396 for ANDING by gate 381 during the sweep hold pulse to deflection amplifier 398 and the separate horizontal deflection coil 173h'. Since the position of the potentiometer arms 528, 529 on potentiometer 527 is determined by the difference between the signals on roll command input 138 and roll 170, the angle to which the waveforms are resolved is the difference between command roll and actual roll.

It has been further discovered that a second symbol can be traced in each alternate vertical blanking period, whereby the number of symbols which would normally be available in a calligraphic presentation is doubled. That is, in the present arrangement wherein the symbol is traced during approximately twenty lines borrowed from the retrace time, a limited number of symbols can be traced by the time sharing of such period. According to the present invention the number of symbols may be doubled by providing different symbol traces after alternate rasters. The quantity of calligraphic symbols which can then be presented will be limited only to the band pass width of the deflection circuits and/or the brightness required of the display.

Figure 4A:
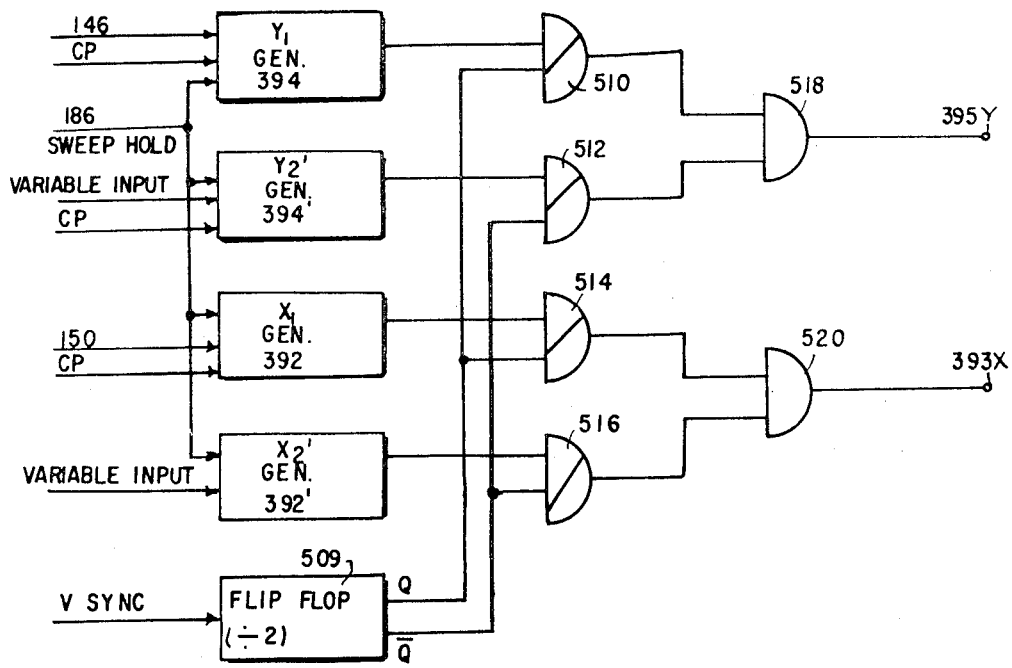
FIG. 4A sets forth circuitry for generating different symbols in successive raster traces.
Figure 4B:
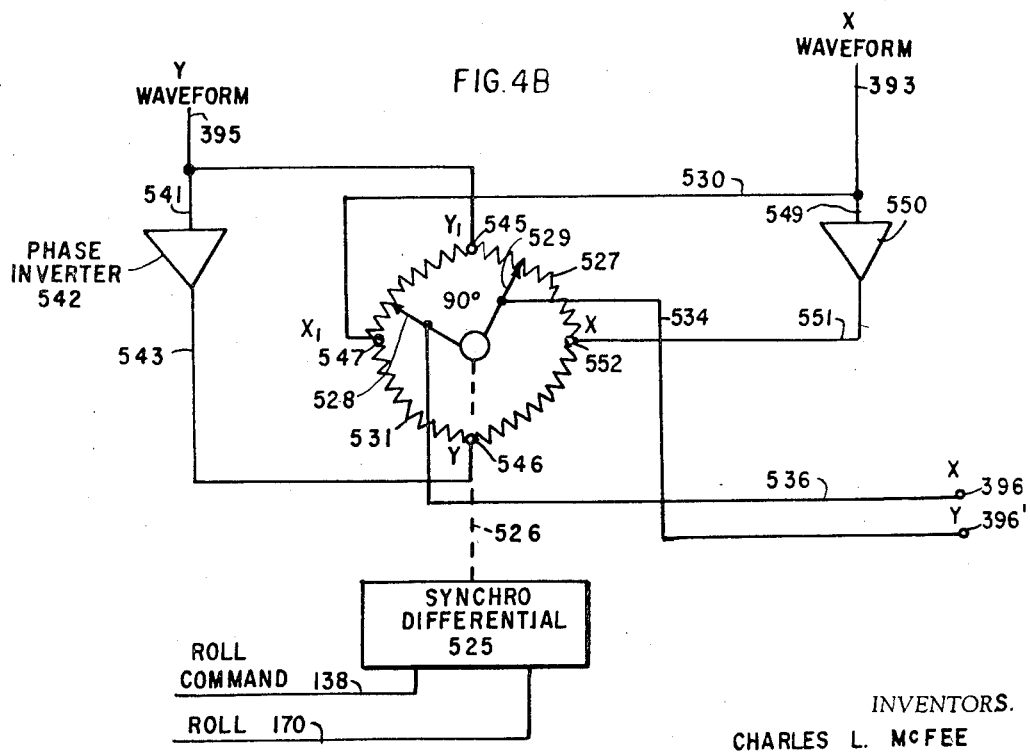
FIG. 4B sets forth the details of the command roll resolver module of FIG. 3.

With reference now to FIG. 4A a pair of X, Y generators, such as generators 392, 394 (FIG. 3) may be used for the first pair. A second set of generators $X_2'$, $Y_2'$ (392', 394') are built to generate the $X_2$, $Y_2$ waveforms for the second symbol to be presented.

A flip-flop circuit 509 having a first input connected to the vertical sync conductor V provides a Q output to gates 510, 514 and a $\overline{Q}$ output to gates 512, 516. The outputs of gates 510, 512 are connected over OR gate 518 to Y waveform conductor 395, and the outputs of AND gate 514, 516 are connected over OR gate 520 to X conductor 393.

In operation, when flip-flop 509 is in one state (Q positive) gates 510, 514 are conditioned to AND the $X_1Y_1$ outputs of the first generator set 392, 394 over OR gates 518, 520 to conductor 395, 393. AND gates 512, 516 are inhibited by $\overline{Q}$. At the start of the next raster trace, the vertical sync signal shifts the flip-flop 509 and $\overline{Q}$ becomes positive to condition AND gates 512, 516 to transmit the waveform output of the second generator set $X_2'$, $Y_2'$ over OR gates 518, 520 to conductors 395, 393. It is apparent that such arrangement results in the trace of different symbols in alternate raster traces.

While what is described is regarded to be a preferred embodiment of the invention, it will be apparent that variations, rearrangements, modifications and changes may be made therein within departing from the scope of the present invention as defined by the appended claims.

We claim:
1. In a display system having display means for providing a video presentation of information for a mobile unit, a first video generator means for providing wave- forms to produce a first set of cues on said display means to provide attitude information for the mobile unit including the roll attitude of the mobile unit, second video generator means for providing waveforms which provide a second set of cues on said display means to provide command information including command roll information for the mobile unit, and roll means for effecting roll of each of said cue sets on said display independent of roll of the other of said cue sets on said display.

2. A system as set forth in claim 1 in which said roll means includes input means for providing roll signals to said first and second video generator means, a first control means for effecting roll of the cues of said first and second sets in response to said roll signals, and a second control means for effecting roll of said second set of cues in a direction opposite to and by an amount related to the degree of roll introduced by said first control means.

3. In a display system having display means for providing a video presentation of information for a mobile unit, a cathode ray tube having an electron beam gun and beam deflection means, a first video generator means for providing waveforms to said electron beam gun and said deflection means to produce a raster and a first set of cues on said raster, a second video generator means including waveform generator means for providing waveforms to said deflection means to calligraphically provide a second set of cues on said display means, and roll means for effecting roll of either of said cue sets on said display without altering the roll indication of the other of said cue sets on said display.

4. A display system as set forth in claim 3 in which said deflection means comprises a first and a second horizontal deflection coil and at least one vertical coil, and in which said first video generator means includes means for providing signals to said first horizontal coil and said vertical coil to provide a raster on said display means, and in which said waveforms provided by said second video generator means are applied to said second horizontal coil and said vertical coil to effect the trace of said second cue set on said display means.

5. A display system as set forth in claim 3 in which said roll means includes a first input for providing a first signal set representative of the roll position of the mobile unit, and means for adjusting the first set of cues on said raster to such angle of roll, command input means for providing input signals indicating the degree of roll to be provided in the display of said second set of cues, roll resolver means for modifying the waveform output of said waveform generator means in said second video generator means to introduce the degree of roll into said second cue set indicated by said command input signals, and means in said roll resolver means controlled by said first signal set to effect roll of said second set of cues in a direction opposite to and by an amount related to the degree of roll indicated by said first signal set.

6. A display system as set forth in claim 3 in which said roll means includes input means for providing roll signals, a first control means for effecting roll of the cues of said first and second sets in response to said roll signals, and a second control means responsive to said roll signals to effect roll of said second set of cues in a direction opposite to and by an amount related to the degree of roll introduced by said first control means, whereby said first set of cues is rotated without effecting rotation of said second set of cues.

7. In a display system having display means for providing a video presentation of information for a mobile unit, a cathode ray tube having an electron beam gun and beam deflection means, a first video generator means for providing waveforms to said electron beam gun and said deflection means to produce a raster and a first set of cues on said raster, a second video generator means including waveform generator means for providing waveforms to said deflection means to calligraphically provide a second set of cues on said display means, roll means for effecting roll of said second cue sets on said display independent of roll of said first cue set on said display, including input means for providing a first set of roll signals, a first control means for effecting roll of said first and second set of cues in response to said signals, a second control means responsive to said first set of roll signals to effect roll of said second set of cues in a direction opposite to and by an amount related to the degree of roll introduced by said first control means, and command input means for providing command roll signals to said second control means, said second control means being operative to roll only said second cue sets on said display in response to said command roll signals.

8. In a display system for providing a video presentation of information for a mobile unit including cathode ray tube display means having deflection means and an electron beam gun, raster generator means including means for providing horizontal and vertical sawtooth pulses to said deflection means to provide repetitive raster traces on said display means, a first video generator means for providing waveforms to the electron gun of said cathode ray tube to produce a first set of cues on said raster, and a second video generator means for providing waveforms to control said deflection means to effect writing of a second set of cues on said display means immediately after a raster trace and prior to a subsequent raster trace, and means for inhibiting application of at least said horizontal pulses to said deflection means during said period of writing.

9. In a display system for providing a video presentation of information for a mobile unit including cathode ray tube display means having deflection means and an electron beam gun, raster generator means including sawtooth generator means for providing horizontal and vertical sawtooth pulses to said deflection means to provide a raster on said display means, a first video generator means for providing waveforms to the electron gun of said cathode ray tube to produce a first set of cues on said raster, a second video generator means for providing waveforms to control said deflection means to effect writing of a second set of cues on said display means immediately after a raster trace, and means for providing a sweep hold pulse to said raster generator means to inhibit generation of at least said horizontal sawtooth pulses during said period of cue writing.

10. A system as set forth in claim 9 which includes means for coupling said hold pulse to the start circuit for said second video generator means.

11. In a display system having cathode ray tube display means having deflection means for providing a video presentation of information for a mobile unit, raster generator means for controlling said deflection means to provide a raster on said display means and a first video generator means for providing waveforms to the electron gun of said cathode ray tube to produce a first set of cues on said raster, a second video generator means for providing waveform to control said deflection means to effect writing of a second set of cues on said display means, a third video generator means for providing waveforms to control said deflection means to effect writing of a third set of cues on said display means, and means for enabling said second video generator after one raster trace and said third video generator after a succeeding raster trace.

12. In a display system having display means for providing a video presentation of information for a mobile unit, a first video generator means for providing waveforms to produce a first set of cues on said display means indicating the pitch and roll attitudes of the unit, a second video generator means for providing waveforms which provide a command set of cues on said display means indicating the desired pitch attitude of the unit, and means for modifying said waveform of said second video generator means to provide an indication of roll in said second set of cues on said display without altering the roll indication provided by the other of said cue sets on said display.

13. A system as set forth in claim 12 which includes input means for providing a set of input signals indicating a desired yaw command to said second video generator, and in which said second video generator effects a corresponding lateral displacement of said command set of cues.

14. In a display system including cathode ray tube display means having deflection means for providing a video presentation of information for a mobile unit, a first video generator means for providing waveforms to produce a first set of cues on said display, a second video generator means for providing waveforms to control said deflection means to effect writing of a set of command cues on said display means comprising a first input for providing signals representative of command pitch, a first waveform generator for providing a waveform output at a Y coordinate determined by said command pitch signal, a second input for providing signals representative of yaw commands, a second waveform generator for providing a waveform output at an X coordinate determined by said yaw signals, and means for coupling said signals to said deflection means.

15. A system as set forth in claim 14 in which said last means includes roll resolver means for modifying said waveforms output from said first and second waveform generator to display command roll information.

16. In a display system including cathode ray tube display means having deflection means for providing a video presentation of information for a mobile unit, raster generator means for controlling said deflection means to provide a raster on said display means, and a first video generator means for providing waveforms to the electron gun of said cathode ray tube to produce a first set of cues on said raster, a second video generator means for providing waveforms to control said deflection means to effect writing of a command symbol on said display means, including a first input circuit, a first waveform generator for providing a waveform at an X coordinate determined by said first input circuit, a second input circuit, a second waveform generator for providing a waveform at the Y coordinate determined by said second input circuit, means for modifying said waveforms output from said first and second waveform generator to provide a display of roll by said command symbol, means for providing a hold pulse to inhibit raster generation during said period of cue writing, and means for coupling said hold pulse to the start circuit for said first and second waveform generator.

17. In a system having display means for presenting command information for a mobile unit having motion about several axes, command signal generator means for providing a command symbol on said display means indicating the desired attitude motion of the unit about at least one axis including input means for providing command signals indicating a desired decrab maneuver, a fixed reference symbol for referencing of said command symbol, and means for adjusting said command symbol laterally to different positions on the display relative to said fixed reference symbol for different decrab command signals.

18. In a system having display means for presenting command information for a mobile unit having motion about several axes, command signal generator means for providing a command symbol on said display means indicating the desired motion of the unit about such axes including a first input means for providing pitch command signals indicating a desired change in pitch attitude, a second input means for providing decrab command signals indicating a desired decrab action, a third input means for providing roll command signals indicating desired changes in roll attitude, means for adjusting said command symbol on said display means vertically for different pitch command signals, means for adjusting said command symbol laterally on the display for different decrab command signals, and means for rotating said symbol about its roll axis for different input roll signals.

19. In a system for providing a display of command and attitude information for a mobile unit having motion about a plurality of axes, a command signal generator means for providing a command symbol on the display indicating the desired attitude motion for the unit about such axes including a first input means for providing command signals which effect changes in the attitude of the command symbol on the display about its roll axis as necessary to command a desired degree of bank by the unit about its roll axis, and a second means for providing display of a further symbol comprising a horizon line on the same display indicating the actual roll attitude of the unit, and means for at times effecting roll of said horizon line independent of roll of said command signal.

20. A system as set forth in claim 19 which includes a fixed symbol for said display as a reference for said command symbol, and in which said unit is maneuvered in roll and pitch to effect registration of the command symbol and fixed symbol in both the roll and pitch attitudes.

References Cited

UNITED STATES PATENTS

| | | | |
|---|---|---|---|
| 2,896,113 | 7/1959 | List | 315—24 |
| 3,145,378 | 8/1964 | Lyons | 340—324.1 |
| 3,331,069 | 7/1967 | Cornell et al. | 178—6.8 |

ROBERT L. GRIFFIN, Primary Examiner

B. L. LEIBOWITZ, Assistant Examiner

U.S. Cl. X.R.
35—10.2; 340—324.1